(12) United States Patent
Lee

(10) Patent No.: US 9,971,177 B2
(45) Date of Patent: May 15, 2018

(54) DISPLAY DEVICE

(71) Applicant: Samsung Display Co., LTD., Yongin, Gyeonggi-Do (KR)

(72) Inventor: Ik Sang Lee, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 311 days.

(21) Appl. No.: 14/806,982

(22) Filed: Jul. 23, 2015

(65) Prior Publication Data

US 2016/0077372 A1    Mar. 17, 2016

(30) Foreign Application Priority Data

Sep. 11, 2014    (KR) .......................... 10-2014-0120064

(51) Int. Cl.
*G02F 1/1333*    (2006.01)

(52) U.S. Cl.
CPC .................. *G02F 1/133308* (2013.01); *G02F 2001/133314* (2013.01); *G02F 2001/133322* (2013.01); *G02F 2201/465* (2013.01)

(58) Field of Classification Search
CPC ........ G02F 2001/133308; G02F 2001/133314; G02F 2001/133317; G02F 2001/133322
See application file for complete search history.

(56) References Cited

U.S. PATENT DOCUMENTS

2009/0303408 A1* 12/2009 Huang .............. G02F 1/133308
349/58
2013/0083512 A1    4/2013 Park

FOREIGN PATENT DOCUMENTS

| KR | 1020080006366 A | 1/2008 |
| KR | 1020080022991 A | 3/2008 |
| KR | 1020080061053 A | 7/2008 |

* cited by examiner

*Primary Examiner* — Phu Vu
(74) *Attorney, Agent, or Firm* — H.C. Park & Associates, PLC

(57) ABSTRACT

A display device includes: a display panel; a light source configured to supply light to the display panel; a bottom chassis comprising a lower portion, a support bent from the lower portion, and a hemming unit overlapping the support; and a mold frame coupled to the bottom chassis and comprising a protrusion, wherein the bottom chassis includes a coupling hole at the lower portion, the hemming unit is disposed on an upper surface of the mold frame, and the protrusion is inserted into the coupling hole.

18 Claims, 6 Drawing Sheets

DISPLAY DEVICE

CLAIM OF PRIORITY

This application claims the priority to and all the benefits accruing under 35 U.S.C. § 119 of Korean Patent Application No. 10-2014-0120064, filed on Sep. 11, 2014, with the Korean Intellectual Property Office ("KIPO"), the disclosure of which is incorporated herein in its entirety by reference.

BACKGROUND OF THE INVENTION

1. Field of the Invention

Aspects of embodiments of the present invention relate to a display device in which coupling force between a mold frame and a bottom chassis is improved.

2. Description of the Related Art

A liquid crystal display (LCD) is a type of flat panel displays (FPDs), which is most widely used these days. The LCD includes two substrates including electrodes formed thereon and a liquid crystal layer interposed therebetween. Upon applying voltage to two electrodes, liquid crystal molecules of the liquid crystal layer are rearranged, thereby adjusting an amount of transmitted light.

A liquid crystal display (LCD), which is a passive light emitting device, includes a display panel configured to display an image on a screen, a mold frame on which the display panel is mounted, and a backlight assembly configured to provide light to the display panel. The mold frame may be coupled to the bottom chassis that forms a framework of the backlight assembly using a coupling structure such as a hook.

Meanwhile, LCD devices with slimmer structure and lighter weight have been developed so as to improve product competitiveness. In particular, studies have been conducted to develop an LCD device reduced in overall size by reducing a width of a bezel, that is, a distance between an outer edge of the LCD device and an adjacent side of an active area that actually displays an image. In order to achieve such a narrow bezel, a support of a bottom chassis has been reduced in thickness. In accordance with the reduced thickness of the support of the bottom chassis, coupling force of a hook structure between the mold frame and the bottom chassis is weakened, such that the mold frame or the bottom chassis may be disadvantageously bent at a coupling portion. Further, the hook formed on the bottom chassis or the mold frame may be broken, thereby causing poor coupling.

Accordingly, there is a demand for a coupling structure that can improve coupling force of hook coupling between the mold frame and the bottom chassis.

It is to be understood that this background of the technology section is intended to provide useful background for understanding the technology and as such disclosed herein, the technology background section may include ideas, concepts or recognitions that were not part of what was known or appreciated by those skilled in the pertinent art prior to a corresponding effective filing date of subject matter disclosed herein.

SUMMARY OF THE INVENTION

Embodiments of the present invention are directed to a display device designed to intensify coupling force of a hook coupling structure of a mold frame and a bottom chassis and improved in device strength.

According to an embodiment of the present invention, a display device includes: a display panel; a light source configured to supply light to the display panel; a bottom chassis comprising a lower portion, a support bent from the lower portion, and a hemming unit overlapping the support; and a mold frame coupled to the bottom chassis and comprising a protrusion, wherein the bottom chassis may include a coupling hole at the lower portion, the hemming unit may be disposed on an upper surface of the mold frame, and the protrusion may be inserted into the coupling hole.

The mold frame may include a base unit and a side wall portion extending from upper and lower surfaces of the base unit in a direction perpendicular to the base unit.

The protrusion may extend from at least a part of a lower portion of the side wall portion of the mold frame.

The side wall portion may have an inserting groove.

The hemming unit may be disposed in the inserting groove of the side wall portion.

The protrusion may be disposed to correspond to the inserting groove of the side wall portion.

The hemming unit may be disposed to correspond to the protrusion of the mold frame.

The hemming unit may be disposed to correspond to the coupling hole of the bottom chassis.

The side wall portion may be coupled to the support of the bottom chassis.

The display panel may be disposed on the base unit of the mold frame.

The hemming unit may be bent from the support of the bottom chassis.

The hemming unit may be in contact with one surface of the support.

The display panel may be disposed on the mold frame.

The display device may further include a top chassis configured to surround the support of the bottom chassis and a part of the upper surface of the display panel.

According to aspects of embodiments of the present invention, a display device may achieve a narrow bezel and stably fix a display panel.

The foregoing is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
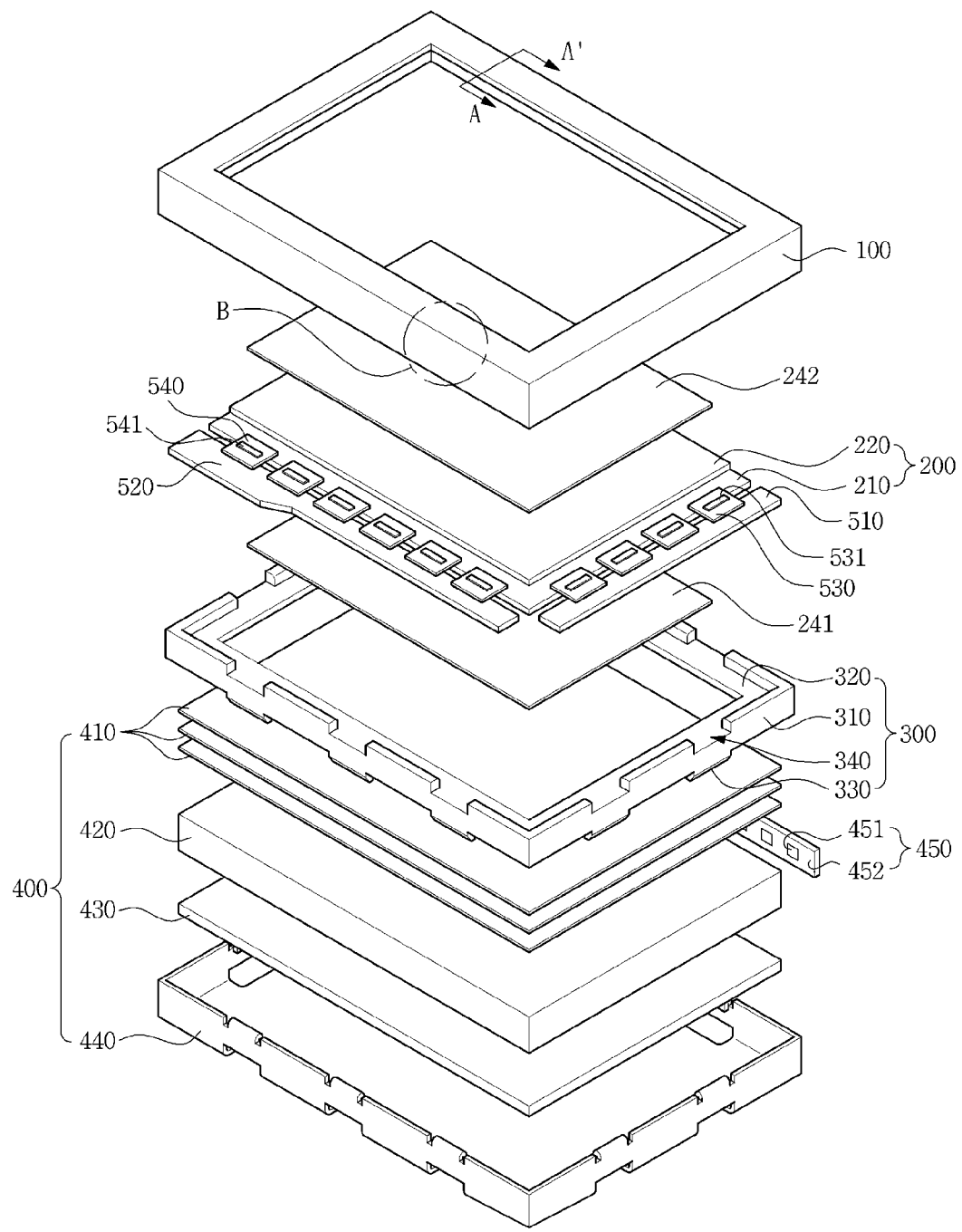
FIG. 1 is a schematic exploded perspective view illustrating a display device according to one embodiment of the present invention.

Advantages and features of the present invention and methods for achieving them will be made clear from embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Therefore, well-known constituent elements, operations and techniques are not described in detail in the embodiments in order to prevent the present invention from being obscurely interpreted. Like reference numerals refer to like elements throughout the specification.

The spatially relative terms "below", "beneath", "lower", "above", "upper", and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device shown in the drawing is turned over, the device positioned "below" or "beneath" another device may be placed "above" another device. Accordingly, the illustrative term "below" may include both the lower and upper positions. The device may also be oriented in the other direction, and thus the spatially relative terms may be interpreted differently depending on the orientations.

Throughout the specification, when an element is referred to as being "connected" to another element, the element is "directly connected" to the other element, or "electrically connected" to the other element with one or more intervening elements interposed therebetween. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Hereinafter, the display device according to one embodiment of the present invention will be described in detail with reference to FIGS. 1 and 2.

FIG. 1 is a schematic exploded perspective view illustrating a display device according to one embodiment of the present invention. FIG. 2 is a cross-sectional view taken along a line A-A' of FIG. 1.

Figure 2:
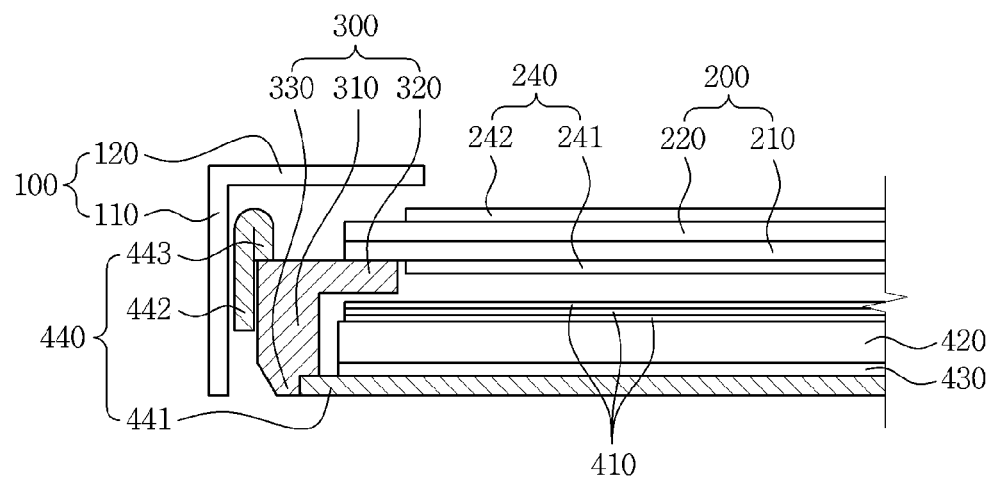
FIG. 2 is a cross-sectional view taken along line A-A' of FIG. 1.

Referring to FIGS. 1 and 2, the display device may include a display panel 200 configured to display an image, a backlight assembly 400 configured to supply light to the display panel 200, a top chassis 100 provided in a form of surrounding the display panel 200, and a mold frame 300 on which the display panel 200 is mounted.

The top chassis 100 may be coupled to a bottom chassis 440 to cover an edge portion of the display panel 200 mounted on the mold frame 300. The top chassis 100 may have a side surface portion 110 coupled to the bottom chassis 440 and a bending portion 120 bent and extending from the side surface portion 110. The edge portion of the display panel 200 covered by the top chassis 100 is a non-display area. The top chassis 100 may have an opening at a center portion and the display panel 200 may be exposed therethrough.

Further, the top chassis 100 may be configured to protect driving-chip mounting films 530 and 540 and printed circuit boards PCBs 510 and 520 and to prevent them from being separated from the bottom chassis 440.

The top chassis 100 may be coupled to the bottom chassis 440 by hooks and/or screws (not shown). Further, the top chassis 100 and the bottom chassis 440 may be coupled to each other in a variety of methods.

The display panel 200 may be configured to display an image. The display panel 200 may be a light-receiving type display panel and may be categorized into an LCD panel, an electrowetting display panel, an electrophoretic display panel, a microelectromechanical system (MEMS) display panel, and the like. It is assumed that the LCD panel is used as one embodiment of the present invention.

The display panel 200 may be provided in a quadrilateral panel form having two pairs of parallel sides. According to one embodiment of the present invention, the display panel 200 may have a rectangular form having a pair of long sides and a pair of short sides. The display panel 200 may include a first substrate 210, a second substrate 220 disposed to face the first substrate 210, and a liquid crystal layer (not illustrated) interposed between the first and second substrates 210 and 220. The display panel 200, when viewed in a plane, may have a display area which displays an image and a non-display area which surrounds the display area and does not display an image. The non-display area may be covered by the top chassis 100.

The first substrate 210 may include a plurality of pixel electrodes (not illustrated) and a plurality of TFTs (not illustrated) electrically connected to the pixel electrodes in one-to-one correspondence. A data line may be connected to a source electrode of the TFT, a gate line may be connected to a gate electrode thereof, and a pixel electrode may be connected to a drain electrode thereof. Each TFT may function as a switch of a driving signal supplied to the corresponding pixel electrodes. Further, the second substrate 220 may include a common electrode (not illustrated) forming an electric field that controls an arrangement of the liquid crystals with the pixel electrodes. The display panel 200 may be configured to drive the liquid crystal layer to display an image frontwards.

The display panel 200 may include: driving chips 531 and 541 configured to apply a driving signal; the driving-chip mounting films 530 and 540 on which the driving chips 531 and 541 are mounted; and PCBs 510 and 520 electrically connected to the display panel 200 through the driving-chip mounting films 530 and 540. The driving-chip mounting film may be a tape carrier package (TCP).

The driving-chip mounting films 530 and 540 and PCBs 510 and 520 may be bent from one end portion of the display panel 200 and disposed on a side surface of the mold frame 300.

The driving chips 531 and 541 may generate a driving signal for driving the display panel 200 in response to an external signal. The external signal may be supplied from the PCBs 510 and 520 and may include an image signal, multiple control signals, and a driving voltage.

For example, the gate PCB 510 may be connected to the gate driving-chip mounting film 530. The gate PCB 510 may supply an image signal to the gate driving chip 531. The data PCB 520 may be connected to the data driving-chip mounting film 540. The data PCB 520 may supply an image signal to the data driving chip 541.

The gate driving chip 531 may receive the image signal and supply a gate driving signal to the gate line. The data driving chip 541 may receive the image signal and supply a data driving signal to the data line.

polarizers 240 may be disposed on the display panel 200 and include first and second polarizers 241 and 242. The first and second polarizers 241 and 242 may be respectively disposed on the opposite sides of facing surfaces of the first and second substrates 210 and 220. That is, the first polarizer 241 may be attached on an outer side of the first substrate 210 and the second polarizer 242 may be attached on an outer side of the second substrate 220. A transmissive axis of the first polarizer 241 may be substantially at right angles to a transmissive axis of the second polarizer 242.

The mold frame 300 may be coupled to the bottom chassis 440 and accommodate the display panel 200. Such a mold frame 300 may be formed of a flexible material such as plastics, in order to prevent damage on the display panel 200.

The mold frame 300 may be provided along the edge portion of the display panel 200 and support the display panel 200 from the lower portion thereof. The mold frame 300 may be provided in areas corresponding to four sides or at least a part of the four sides of the display panel 200. For example, the mold frame 300 may have a quadrilateral-loop form corresponding to the four sides of the display panel 200, or may have a C-shape, that is a quadrilateral open-loop form corresponding to three sides of the edge portion of the display panel 200.

The backlight assembly 400 may include optical sheets 410, a light guide plate 420, a reflective sheet 430, the bottom chassis 440, and a light source unit 450.

The light source unit 450 may include a light source 451 and a circuit substrate 452 on which the light source 451 is disposed. The light source unit 450 may be disposed at a corner portion or a light-incident side surface of the light guide plate 420. That is, the light source unit 450 may emit light toward the corner portion or the light-incident side surface of the light guide plate 420.

The light source 451 may include at least one light emitting diode (LED) chip (not illustrated) and a package (not illustrated) for accommodating the LED chip. The light source 451 may have a light emitting surface in a direction where the light guide plate 420 is disposed.

The circuit substrate 452 may be made of a PCB or a metal PCB.

Such a light source unit 450 may be provided on one, two, or four side surfaces of the light guide plate 420, in consideration of size and luminance uniformity of the display panel 110. In some embodiments, the light source unit 450 may be formed on at least one corner portion of the light guide plate 420.

Light emitted from the light source 451 may be incident on a light-incident side surface of the light guide plate 420 and emitted to the light emitting surface thereof. The light guide plate 420 may be configured to uniformly supply light supplied from the light source unit 450 to the display panel 200. The light guide plate 420 may be disposed adjacent to the light source unit 450 and accommodated in the bottom chassis 440. The light guide plate 420 may be provided, for example, in a quadrilateral panel form as the display panel 200, but is not limited thereto. In some embodiments, when an LED chip is used as the light source 451, the light guide plate 420 may have various forms including a predetermined groove and/or a protrusion according to a position of the light source 451.

The light guide plate 420 is described as a plate for ease of description, but it may be provided in a sheet or film form to achieve slimness of the display devices. That is, light guide plate 420 is to be understood as having a concept that includes not only a plate but also a film for guiding light.

The light guide plate 420 may be formed of a light-transmissive material such as, for example, an acrylic resin, such as polymethylmethacrylate (PMMA), or polycarbonate (PC) so as to guide light efficiently.

A pattern may be formed on at least one surface of the light guide plate 420. For example, a scattering pattern (not illustrated) may be formed on a lower surface, so as to scatter and/or reflect the guided light upwards.

The optical sheets 410 may be disposed on an upper portion of the light guide plate 420 and diffuse and/or collect light transmitted from the light guide plate 420. The optical sheets 410 may include one or more of a diffusion sheet, a prism sheet, a protective sheet, and other functional sheets.

The diffusion sheet may be configured to disperse light incident from the diffusion plate 420 so as to prevent the light from being partly concentrated.

The prism sheet may include prisms having a triangular cross-section (not shown) and formed in a predetermined array on one surface thereof. The prism sheet may be disposed on the diffusion sheet and may collect light diffused from the diffusion sheet in a direction perpendicular to the display panel 200.

The protective sheet may be disposed on the prism sheet and may serve to protect a surface of the prism sheet and diffuse light to achieve a uniform light distribution.

The reflective sheet 430 may be disposed between the light guide plate 420 and the bottom chassis 440. The reflective sheet 430 may reflect light emitted downwards from the diffusion plate 420 to be directed toward the display panel 200, thereby improving light efficiency.

The reflective sheet 430 may be formed of, for example, polyethylene terephthalate (PET) to possess reflectivity. One surface of the reflective sheet 430 may be coated with a diffusion layer containing, for example, titanium dioxide.

In some embodiments, the reflective sheet 430 may be formed of a material containing metal, such as silver (Ag).

The bottom chassis 440 may accommodate the reflective sheet 430 and the light guide plate 420. A lower surface of the bottom chassis 440 may be parallel to the light guide plate 420. The bottom chassis 440 may be formed of a metal material having rigidity, such as stainless steel, or a material having good heat dissipation properties, such as aluminum or an aluminum alloy. According to an embodiment of the present invention, the bottom chassis 440 is responsible for maintaining a framework of the display device and protecting a variety of components accommodated therein.

Meanwhile, a hook coupling structure of a conventional display device may be described with reference to FIGS. 3A and 3B.

Figure 3A:
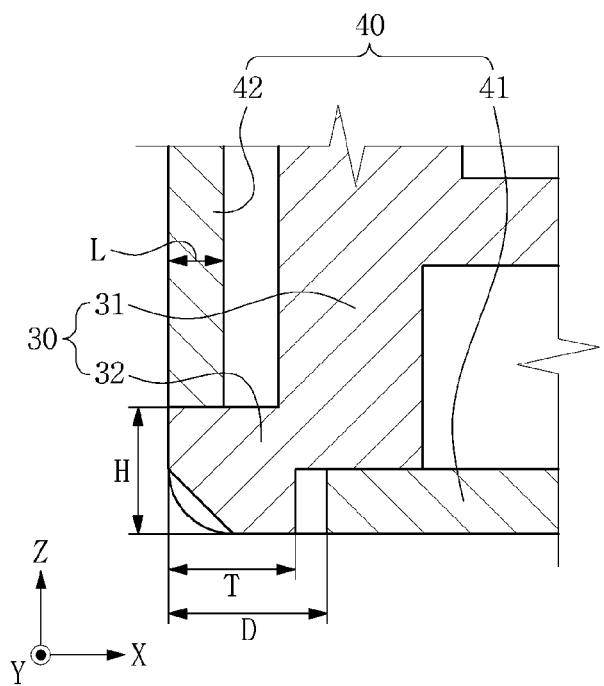
FIG. 3A is a schematic cross-sectional view illustrating conventional mold frame and bottom chassis.

FIG. 3A is a schematic cross-sectional view illustrating conventional mold frame and bottom chassis. FIG. 3B is a schematic perspective view illustrating the conventional mold frame and bottom chassis.

Figure 3B:
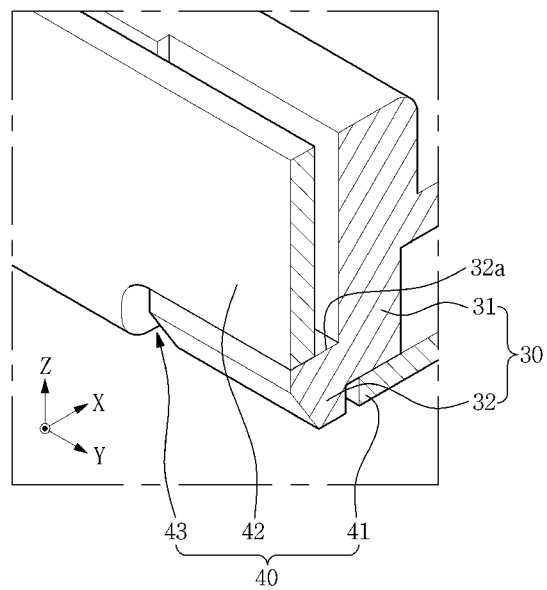
FIG. 3B is a schematic perspective view illustrating the conventional mold frame and bottom chassis.

Referring to FIGS. 3A and 3B, the bottom chassis 40 may include a lower portion 41 and a support 42 and the mold frame 30 may include a side wall portion 31 and a coupling protrusion 32. Further, the bottom chassis 40 may have a coupling hole 43 to which the coupling protrusion 32 is coupled. The conventional display device has a hook coupling structure where the coupling protrusion 32 of the mold frame 30 and the coupling hole 43 of the bottom chassis 40 are coupled to each other. However, with the recent slim display devices, a thickness L of the support 42 of the bottom chassis 40 becomes thin. As the thickness L of the support 42 becomes thin, the coupling force between the coupling protrusion 32 and the coupling hole 43 is reduced and the strength of the display device is also reduced. That is, only with the thin support 42, the coupling force induced by coupling of the coupling protrusion 32 in Z-axis direction is reduced.

In addition, as a mounting surface 32a of the coupling protrusion 32 is formed on which the support 42 of the bottom chassis 40 is mounted, the strength of the coupling protrusion 32 is reduced. Meanwhile, in order to achieve a stable coupling structure of the mold frame 30 and the bottom chassis 40, a height H of the coupling protrusion 32, a thickness T of the coupling protrusion, and a diameter D of the coupling hole 43 should be manufactured according to design. If one of the structures including the height H of the coupling protrusion 32 is different from a designed value, the mold frame 30 and the bottom chassis 40 may cause coupling defects.

Therefore, the display device according to an embodiment of the present invention may form a hemming unit 443 on the support 442 of the bottom chassis 440. Hereinafter, a coupling structure of the bottom chassis 440 and the mold frame 300 according to an embodiment of the present invention will be described with reference to FIGS. 2, 4, and 8.

Figure 4:
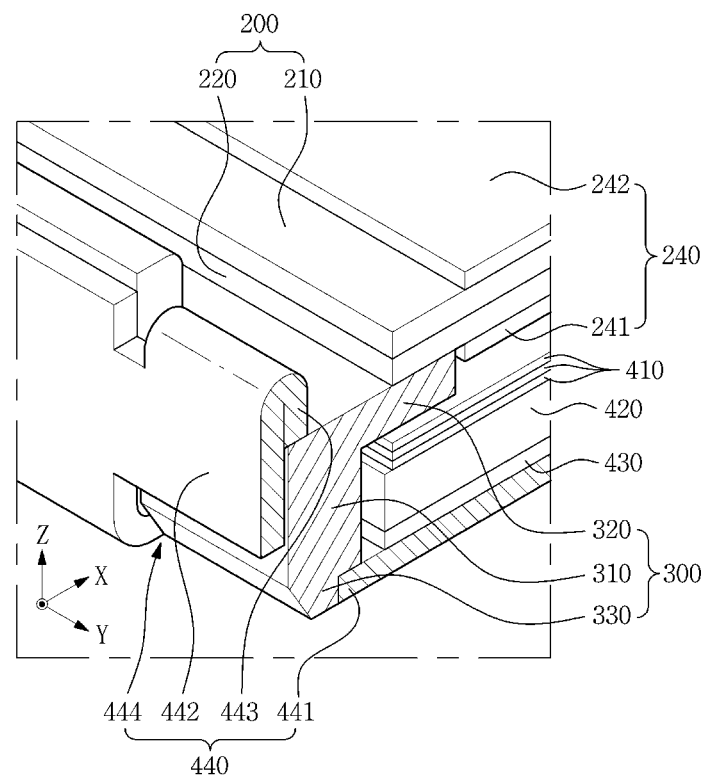
FIG. 4 is an enlarged perspective view illustrating "B" part illustrated in FIG. 1.
Figure 5:
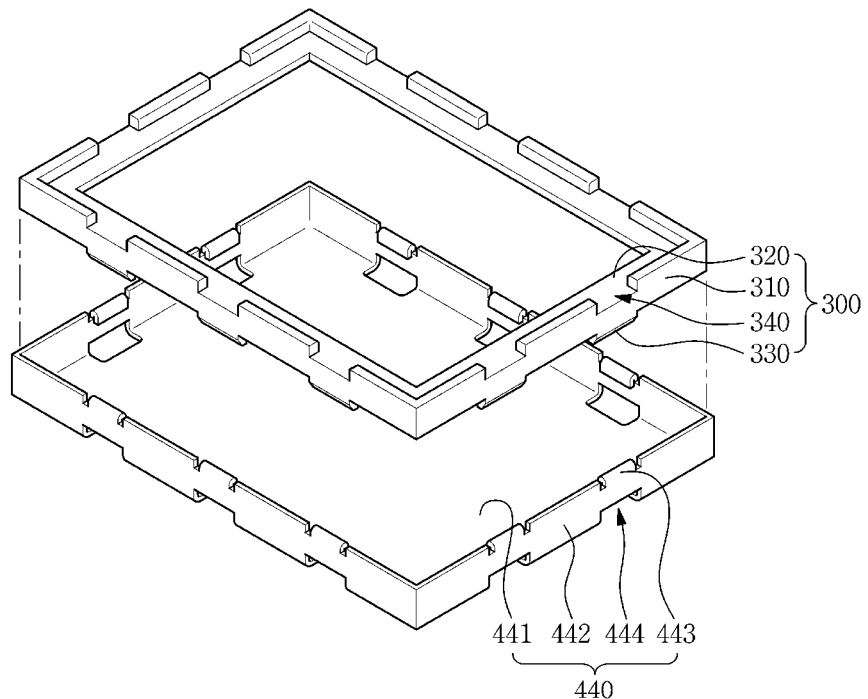
FIG. 5 is a schematic exploded perspective view illustrating a mold frame and a bottom chassis.
Figure 6:
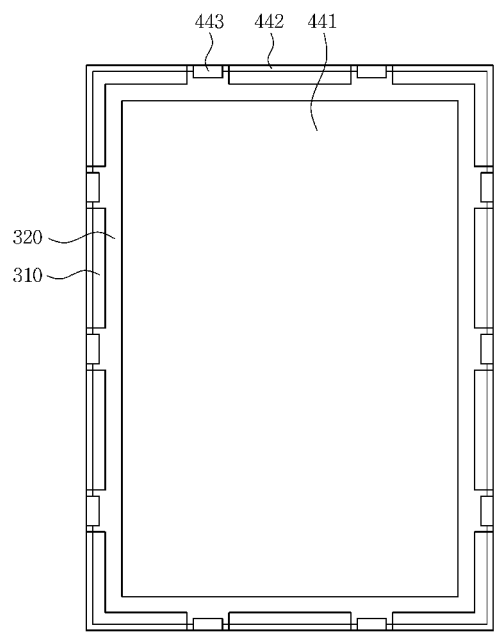
FIG. 6 is a schematic plan view illustrating the mold frame and the bottom chassis.
Figure 7:
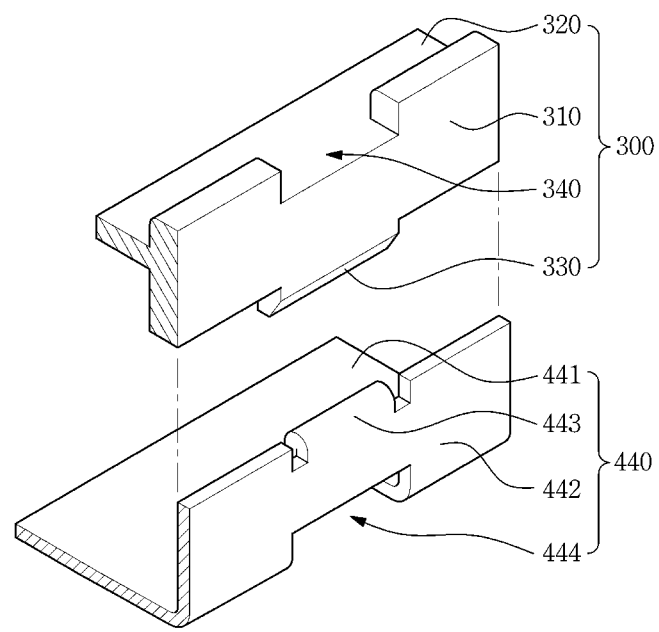
FIG. 7 is a schematic exploded perspective view illustrating the mold frame and the bottom chassis.
Figure 8:
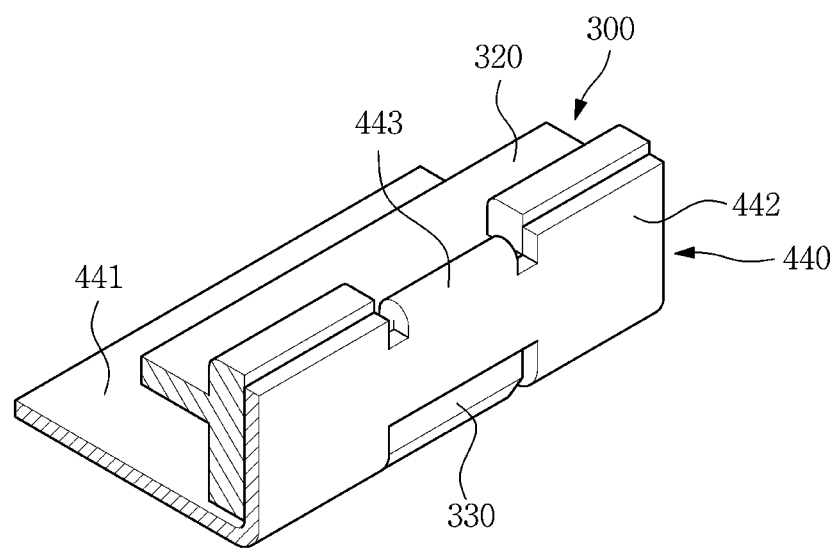
FIG. 8 is a schematic perspective view illustrating a coupling structure of the mold frame and the bottom chassis.

FIG. 4 is an enlarged perspective view illustrating "B" part illustrated in FIG. 1. FIG. 5 is a schematic exploded perspective view illustrating a mold frame and a bottom chassis. FIG. 6 is a schematic plan view illustrating the mold frame and the bottom chassis. FIG. 7 is a schematic exploded perspective view illustrating the mold frame and the bottom chassis. FIG. 8 is a schematic perspective view illustrating a coupling structure of the mold frame and the bottom chassis.

Referring to FIGS. 2, 4, and 8, the bottom chassis 440 may include a lower portion 441, a support 442 bent from the lower portion 441, and a hemming unit 443 overlapping the support 442. Further, the bottom chassis 440 may have a coupling hole 444 on the lower portion 441.

The lower portion 441 may accommodate a light guide plate 420 and a light source unit 450.

The hemming unit 443 may be bent from the support 442 of the bottom chassis 440 and brought into contact with one surface of the support 442. The hemming unit 443 may be disposed to correspond to a protrusion 330. Further, the hemming unit 443 may be disposed to correspond to the coupling hole 444 of the bottom chassis 440.

The coupling hole 444 may play a role in guiding the protrusion 330 of the mold frame 300 to be coupled. Thus, the coupling hole 444 may have a depth to allow the protrusion 330 to be coupled.

The mold frame 300 may include a base unit 320 and a side wall portion 310 extending from upper and lower surfaces of the base unit 320 in a direction perpendicular to the base unit 320.

The side wall portion 310 may be coupled to the support 442 of the bottom chassis 440. The side wall portion 310 may have an inserting groove 340. The hemming unit 443 may be disposed in the inserting groove 340.

The protrusion 330 may be disposed to correspond to the inserting groove 340. The protrusion 330 may be coupled to the coupling hole 444 of the bottom chassis 440 to fix the mold frame 300 to the bottom chassis 440.

In other words, when the mold frame 300 and the bottom chassis 440 are coupled to each other, the hemming unit 443 of the bottom chassis 440 may be disposed in the inserting groove 340 and the protrusion 330 of the mold frame 300 may be inserted to the coupling hole 444 of the bottom chassis 440. The mold frame 300 and the bottom chassis 440 may be tightly fixed to each other by the coupling between the hemming unit 443 and the inserting groove 340 and between the protrusion 330 and the coupling hole 444.

As the mold frame 300 and the bottom chassis 440 are coupled to each other in the above-described manner, the coupling force between the mold frame 300 and the bottom chassis 440 may be improved compared to the conventional display device. That is, as the hemming unit 443 is disposed in the inserting groove 340 of the mold frame 300 and the protrusion 330 is inserted into the coupling hole 444, the coupling force may be improved in Z-axis direction. Further, as the side wall portion 310 and the protrusion 330 are disposed between the support 442 and the coupling hole 444 of the bottom chassis 440, the coupling force may be improved in X-axis direction. Further, as the hemming unit 443 is disposed in the inserting groove 340 of the side wall portion 310, the coupling force may be improved in Y-axis direction. Accordingly, with the coupling structure of an embodiment of the present invention, the coupling force may be improved in X-, Y-, and Z-axis direction.

Further, as the hemming unit 443 plays a role in intensifying the coupling force, the coupling force between the protrusion 330 and the coupling hole 444 may be secured regardless of the thickness of the support 442 of the bottom chassis 440. Further, as described in FIGS. 3A and 3B, the mounting surface 32a of the coupling protrusion 32 is not required to secure the coupling force in Z-axis direction. Accordingly, the protrusion 330 and the coupling hole 444 may be easily manufactured and the defect ratio caused by tolerance may decrease.

Meanwhile, the number of the hemming unit 443, the protrusion 330, the coupling hole 444, and the inserting groove 340 illustrated in FIGS. 5 and 6 is just an example and may be modified. Thus, the hemming unit 443, the protrusion 330, the coupling hole 444, and the inserting groove 340 may be provided in plural in consideration of coupling force and process efficiency.

Hereinafter, another embodiment of the present invention will be described with reference to FIG. 9.

Figure 9:
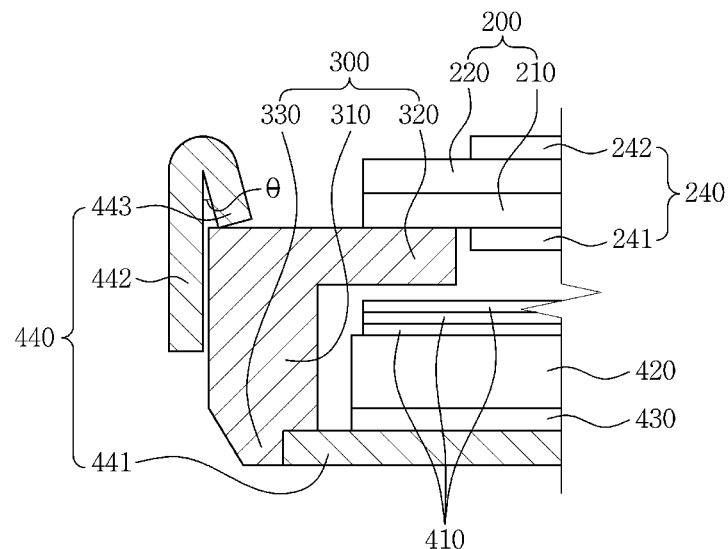
FIG. 9 is a schematic cross-sectional view illustrating a display device according to another embodiment of the present invention.

FIG. 9 is a schematic cross-sectional view illustrating a display device according to another embodiment of the present invention.

Referring to FIG. 9, a hemming unit 443 may be spaced a predetermined distance apart from a support 442. Accordingly, the hemming unit 443 and the support 442 may form a predetermined angle θ with each other. Meanwhile, as the angle θ between the support 442 and the hemming unit 443 is adjusted, an area where the hemming unit 443 and a side wall portion 310 are in contact may also be adjusted and the coupling force may be intensified. The angle θ between the support 442 and the hemming unit 443 may be about 5 to 10 degrees.

Hereinafter, yet another embodiment of the present invention will be described with reference to FIG. 10.

Figure 10:
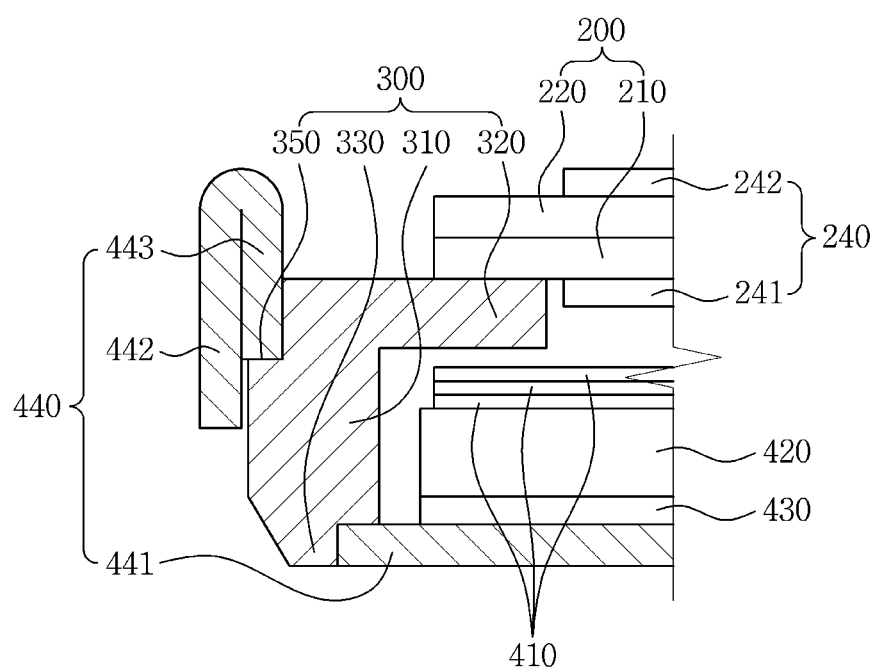
FIG. 10 is a schematic cross-sectional view illustrating a display device according to yet another embodiment of the present invention.

FIG. 10 is a schematic cross-sectional view illustrating a display device according to yet another embodiment of the present invention.

Referring to FIG. 10, a side wall portion 310 may have a fixing groove 350. As the hemming unit 443 is inserted to the fixing groove 350, coupling force between a mold frame 300 and a bottom chassis 440 may be improved.

From the foregoing, it will be appreciated that various embodiments in accordance with the present disclosure have been described herein for purposes of illustration, and that various modifications may be made without departing from the scope and spirit of the present teachings. Accordingly, the various embodiments disclosed herein are not intended to be limiting of the true scope and spirit of the present teachings.

What is claimed is:

1. A display device comprising:
   a display panel;
   a light source configured to supply light to the display panel;
   a bottom chassis comprising a lower portion, a support bent from the lower portion, and a hemming unit overlapping the support, wherein an edge portion is formed where the support bends from the lower portion; and
   a mold frame coupled to the bottom chassis and comprising a protrusion,
   wherein the bottom chassis comprises a coupling hole at the edge portion,
   the hemming unit is disposed on an upper surface of the mold frame, and
   the protrusion is inserted into the coupling hole.

2. The display device of claim 1, wherein the mold frame comprises a base unit and a side wall portion extending from upper and lower surfaces of the base unit in a direction perpendicular to the base unit.

3. The display device of claim 2, wherein the protrusion extends from at least a part of a lower portion of the side wall portion of the mold frame.

4. The display device of claim 3, wherein the side wall portion has an inserting groove.

5. The display device of claim 4, wherein the hemming unit is disposed in the inserting groove of the side wall portion.

6. The display device of claim 4, wherein the protrusion is disposed to correspond to the inserting groove of the side wall portion.

7. The display device of claim 1, wherein the hemming unit is disposed to correspond to the protrusion of the mold frame.

8. The display device of claim 1, wherein the hemming unit is disposed to correspond to the coupling hole of the bottom chassis.

9. The display device of claim 2, wherein the side wall portion is coupled to the support of the bottom chassis.

10. The display device of claim 2, wherein the display panel is disposed on the base unit of the mold frame.

11. The display device of claim 1, wherein the hemming unit is bent from the support of the bottom chassis.

12. The display device of claim 11, wherein the hemming unit is in contact with one surface of the support.

13. The display device of claim 1, wherein the display panel is disposed on the mold frame.

14. The display device of claim 1, further comprising a top chassis configured to surround the support of the bottom chassis and a part of the upper surface of the display panel.

15. The display device of claim 1, wherein an angle between the hemming unit and the support is about 5 to 10 degrees.

16. The display device of claim 2, wherein a fixing groove is formed in the side wall portion, and the hemming unit is inserted to the fixing groove.

17. The display device of claim 1, wherein the protrusion does not overlap with the support in a direction perpendicular to the lower portion and overlaps with the hemming unit in the direction perpendicular to the lower portion.

18. The display device of claim 1, wherein the protrusion overlaps with the lower portion in the direction parallel to the lower portion.

* * * * *